United States Patent [19]

Cardini et al.

[11] Patent Number: 4,579,664
[45] Date of Patent: Apr. 1, 1986

[54] METHOD FOR NATURALLY DRYING MINERAL PULPS

[75] Inventors: Jean L. Cardini, Paris, France; Jean-Pierre Fer, Noumea, New Caledonia; Claude Laurent, Paris, France

[73] Assignee: Société Métallurgique le Nickel -SLN, Paris, France

[21] Appl. No.: 472,811

[22] Filed: Mar. 7, 1983

[30] Foreign Application Priority Data

Mar. 5, 1982 [FR] France ............... 82 03662

[51] Int. Cl.$^4$ ............................................. C02F 1/56
[52] U.S. Cl. ........................................ 210/710; 209/5; 210/734; 210/747; 405/129; 405/264
[58] Field of Search ............ 209/5; 210/609, 702, 210/710, 712, 747, 170, 734; 405/129, 263, 264

[56] References Cited

U.S. PATENT DOCUMENTS

| | | | |
|---|---|---|---|
| 3,770,623 | 11/1973 | Seidel | 210/170 |
| 4,016,073 | 4/1977 | Jordan | 210/170 |
| 4,252,462 | 2/1981 | Klingle et al. | 210/170 |
| 4,347,140 | 8/1982 | Condolios et al. | 210/747 |
| 4,382,863 | 5/1983 | Riise | 210/702 |

FOREIGN PATENT DOCUMENTS

| | | |
|---|---|---|
| 1320293 | 3/1962 | France. |
| 1428846 | 3/1976 | United Kingdom. |

*Primary Examiner*—Peter Hruskoci
*Attorney, Agent, or Firm*—Fleit, Jacobson, Cohn & Price

[57] ABSTRACT

A method of spreading a pulp for the purpose of drying it naturally, the pulp having a solid fraction which has a $d_{80}$ of less than 100 microns. This method comprises the following steps:
(a) adjusting the level of solids of the pulp to between 2 and 25%;
(b) adding a flocculating agent to the pulp and mixing it with same, the amount of said flocculating agent being between two thirds and 98% of the optimum required for the flocculation of said pulp; and
(c) spreading the mixture of pulp and flocculating agent, in the open air, in a bed the sides of which are permeable, and the bottom of which has a slope of less than 5 meters per 1000 meters, said spreading taking place 1 to 20 minutes after the adding and mixing of the flocculating agent.

16 Claims, 3 Drawing Figures

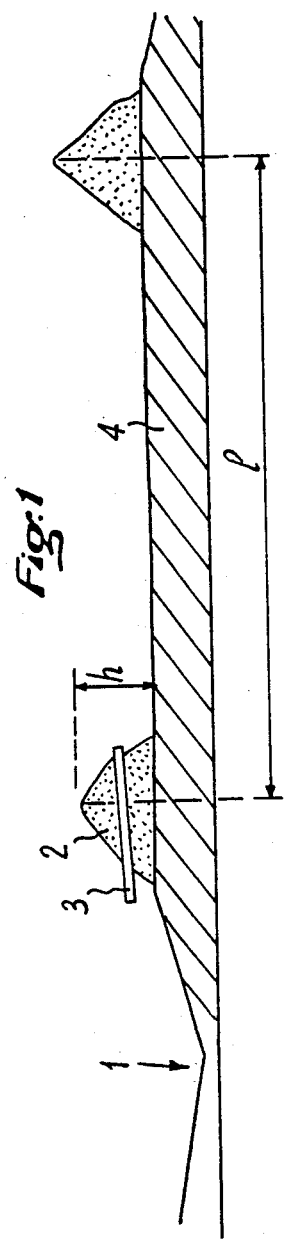
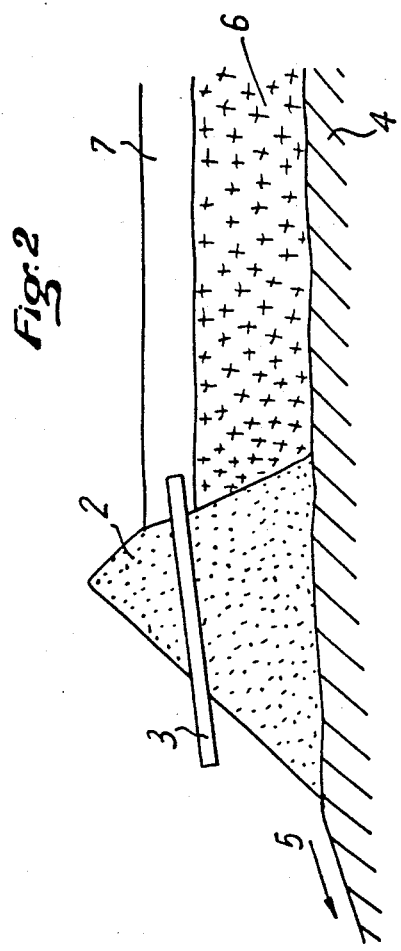
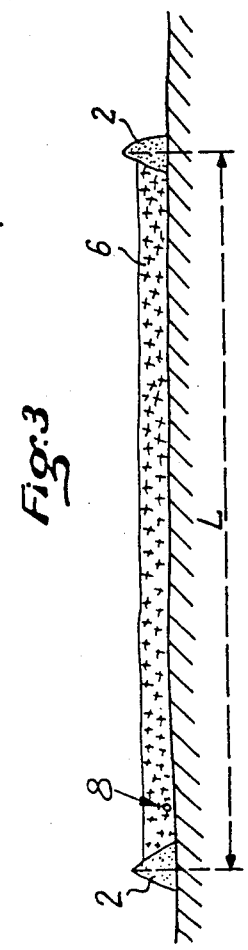

METHOD FOR NATURALLY DRYING MINERAL PULPS

BACKGROUND OF THE INVENTION

1. Field of the Invention

This invention is directed to a method of naturally drying mining and metallurgical pulps. It refers, more particularly, to the treatment of pulps the solid fraction of which has a $d_{80}$ of less than 100 microns and, by preference, of less than 20 microns. The $d_{80}$ is the smallest mesh so which 80% of the product is able to pass.

2. Description of the Prior Art

Such pulps occur very frequently in numerous fields of the mining and metallurgical industries. Slimes of this type may also be produced during the treatment of waste water for the purpose of purifying the water.

The treatment of pulps consisting of very fine fractions is often very difficult, very slow, and very energy-consuming, particularly where one wishes to obtain the dry matter contained therein at a high level of dryness. Accordingly, industry has long sought a drying method that does not have the above-mentioned disadvantages and that reduces the cost of treatment of these materials. A natural drying process whereby evaporation of the water of exposure of the pulp to the atmosphere would be desirable. Techniques of this kind have been used since time immemorial by salt makers who produce, in this way, an important part of the table salts consumed throughout the world.

However, a simple transfer of the techniques of the salt maker to the aforementioned pulps does not provide a satisfactory result. Problems arise, the solution of which have proven to be very difficult. In particular, one can observe that, in the case of products that have reached an almost acceptable degree of dryness, rain may bring about a rehydration and, in that way, cause a considerable loss of time. Moreover, in certain regions, precipitation occurs so frequently and so abundantly that it is practically impossible to dry a pulp in accordance with this technique.

Thus a need has continued to exist for techniques for spreading and for the construction of drying beds, or in other words spreading pans, that make possible for the rain water to flow off without rehydrating the dried pulp.

SUMMARY OF THE INVENTION

It is an object of this invention to develop a method for naturally drying pulp.

It is another object of this invention to provide a method of naturally drying pulp which avoids rehydration resulting from rain fall.

It is yet another object of this invention to provide a method for naturally drying pulp wherein large-sized blocks of dry matter are obtained.

These and other objects are achieved by means of a method of spreading, for the purpose of naturally drying, a pulp, the solid fraction of which has as $d_{80}$ of less than 100 microns, said method comprising the following steps:

(a) adjusting the solid content of the pulp to a value ranging from 2 to 25% in weight;

(b) adding a flocculating agent to the pulp, followed by mixing, the amount of flocculants comprising between two thirds (round numbers) and 98% of the optimum amount required to flocculate said pulp;

(c) spreading said mixture of pulp and flocculating agent in the open air, in a bed the sides of which are permeable, and the bottom of which has a slope of less than 5 meters per 1000 meters, said spreading taking place 1 to 20 minutes after the addition and mixing of said flocculating agent.

BRIEF DESCRIPTION OF THE DRAWINGS

FIG. 1 is a cross-sectional view of a typical bed.

FIG. 2 is a partial cross section showing the bed in operation.

FIG. 3 is a longitudinal section of a typical bed showing preferred spreading points.

DESCRIPTION OF THE PREFERRED EMBODIMENTS

It has been found, surprisingly, that in order to achieve good drying, the level of solids of the pulp must be rather low, and for that reason, if need be, the solid level must be corrected by dilution. Said dilution is, by preference, such that the solid level of the pulp will reach a value ranging from 5 to 15% in weight.

An important point is the addition of the flocculating agent to the pulp and its mixture with same. The amount of that addition is highly critical. On the one hand, it is necessary that the amount of the flocculating agent is sufficient for achieving a sufficiently good flocculation, and on the other hand, it has been observed that addition of too much of the flocculating agent is disadvantageous to a good drying process.

While that explanation does not have a limiting character, it seems that when the flocculating agent is added in an amount ranging from two thirds to 98%, advantageously between 80 (one significant figure) and 98% (two significant figures), and by preference between 85 and 95% of the optimum amount required to flocculate such a pulp, there remain some few particles that have not been flocculated which are deposited on the surface of the flocculated matter, thereby rendering said surface impermeable, thus ensuring the permeability of the whole by the shrinkage of the pulp. That shrinkage causes the cracking of the dry material constituting the blocks, thereby ensuring good permeability and good drainage of the water. The additional levels of said flocculating agent seems to play a part also in the quality of the shrinkage. In certain rainy countries, it is necessary that the cracks reach down to the bottom of the basin, in order that the water may be able to drain off through the latter.

In the course of this entire description, the optimum amount of the flocculating agent is defined as the amount that is necessary and sufficient to achieve the highest speed of sedimentation, said speed being measured, e.g., by means of the laboratory test that is known to the expert under the name of "jar test."

The preferred flocculating agents are the organic flocculants that have a polar group, such as amides, ethers, or esters; among them, we may name the polyacrylamide sold under the trademark "Separan" (see the leaflet issued by the Dow Chemical Company No. EU8564-F-573 printed in Switzerland), polyethylene glycol sold under the trade name of "Floerger FA10" by the company Streichenberger S. A. and the copolymer of acrylamide and acrylate sold under the registered trademark of "Sedipur T.F.5" (see the "Notice Technique" issued on January 1973 under the No. M1977f by BASF). The best results are achieved by the higher molecular weight flocculating agents.

One of the critical aspects of flocculation is found to be the time between the time of flocculation and the time of spreading. The interval between those two operations must range from 1 to 20 minutes, and by preference from 2 to 10 minutes. As a matter of fact, we have found that it is necessary for flocculation to have begun, but not to have been completed, at the time of spreading.

In order to achieve a good dryness of the products and to prevent, as much as possible, any possible problems that may occur following precipitations that may be abundant, it is preferable that the bed in which the natural drying process is carried out, satisfy the conditions set out as follows.

The slope of the bed, or pan, bottom must amount to less than 5 meters per 1000 meters, and advantageously to less than 2 meters per 1000 meters, and preferably should lie between 0.5 and 1.5 meters per 1000 meters.

The bed may have any form whatsoever. It may have a circular shape, in which case the spreading point is situated in the center and the bottom of the bed will then have the form of a highly flattened cone. Likewise, the bed may have the shape of a regular polygon, in which case the bottom will have the shape of a polyhedron, the base of which consists of said polygon. In particular, the form of a regular hexagon is rather satisfactory, to the extent to which it is a form that occupies little space.

For reasons of simplicity and space required, however, the preferred shape is a rectangle whose ratio of length to width lies between 1 and 50, while the width ranges, advantageously, from 5 to 100 m. In this case, the gradient is the lengthwise gradient. In this case of a rectangle, one can place the point of spreading at numerous sites, either at an intersection defined by two planes that constitute the surface of the bottom, or, in a simpler way, when the bottom is perfectly flat, at the highest end of the rectangle, in the middle of the width.

The bottom of the bed consists advantageously of a material selected from the group constituted by filter sand and pulverised soil, preferably of sand the grains of which have a size ranging from 20 microns to 3 mm. Where there is the risk that the drainage through low walls is insufficient, and that is the case, particularly, in rainy countries, it is preferable to select a grain size between 200 microns and 3 mm, so as to ensure good permeability.

The sides of the bed consist advantageously of walls the height of which range from 0.5 m to 1 m. Advantageously, the sides consist of walls made of piles of grainy products having a size of 20 microns to 3 mm, preferably of sand having a grain size of between 200 microns and 3 mm.

In order to facilitate the flow of the water after pouring, the walls may include small nozzles which, by preference, are removable.

The amount of dry solid matter to spread in the form of pulp lies advantageously between 50 and 200 kg/m². These amounts may, however, vary depending on the properties of the product to be dried.

The discharge rate of solid matter at the spreading has to be chosen within the range from 2 to 20 kg/h/m² and preferably from 3 to 8 kg/h/m².

The figures show a non-limitative method of forming a basin for discharge and natural drying. FIG. 1 shows a cross section of a rectangular bed in which (4) is the bottom of the bed, while (2) denotes the walls formed by means of a simple pile of sand the grains of which have a dimension ranging from 200 microns to 3 mm. Removable small nozzles (3) are placed at such a level that there is a good elimination of the water freed by the separation, said water being collected in a drain (1).

FIG. 2 is a partial cross section that shows the basin during operation. The pulp begins to separate and produce free water (7) which flows off through the removable nozzle (3) across the pile of sand (2). The nozzle (3) is placed above the level of the thickened pulp (6). The water (5) filters through across the pile (2) which forms a border and flows likewise toward the drain.

FIG. 3 is a longitudinal section that shows a preferred choice of the spreading point. This point is next to one of the piles (2) that form the breadthwise borders of said basin.

h, l, L denote the height, the width, and the length in these figures; these are, by preference, respectively 0.5 to 1.0 m, 20 to 40 m, and 300 to 500 m, while the slope (not shown) amounts to 0.6 meters per 1000 meters.

Another datum must be taken into consideration, the discharge of water per meter of the wall at the time of spreading. That figure varies with the permeability of the wall, but a figure of 0.2 m³ per hour per meter of the wall is acceptable (for walls of sand having a particle size of from 300 microns to 3 mm).

In the preceding description, the values given in figures are rounded values and the zeroes are not significant figures.

Having generally described the invention, a more complete understanding can be obtained by reference to certain specific examples, which are provided herein for purposes of illustration only and are not intended to be limiting unless otherwise specified.

EXAMPLE 1

Application to the slimes of nickel as obtained by the washing and attrition of garnieritic material in accordance with the technique as described in the French Patent Application No. 75-25.428.

Characteristics of the beds

Dimensions: 30×50 m
Height of the walls: 0.55 m
Slope: 0 meters per 100 meters
Nature of the bottom: sand, 300 microns-3 mm of altered periodotite. This sand is, after numerous drying operations, polluted with finished slime left by the pick-up loaders.
Nature of the walls: sand, 300 microns-3 mm.

Characteristics of the pulp

Slime with grain sizes of less than 20 microns, consisting of the fine part of nickel minerals (iron and magnesium silicates and iron oxides).
Dilution: 11% of solids (89% of soft water)
Flocculation with the aid of the product sold under the trade name "Sedipur" in an amount of 200 g per ton of solids, about 80% of the amount determined by the "jar test."

Characteristics of the spread

Pulp discharge: 20 m³/h
Spreading point: center of the basin
Amount spread: 100 kg of solids per m²

Characteristics of the drying

Gradient of dry products: 0.6/1000
Dryness after 30 days (approximately 75%)

Characteristics of the collection

Front feeder: 100 tons/h

This examples comes very close to the optimal drying conditions.

EXAMPLE 2

Application of the method to nickeliferous slimes obtained by the washing of garnieritic mineral.

Characteristics of the beds

Dimensions: 20×25 m
Height of the walls: 0.55 m
Gradient: 0 meters per 1000 meters
Nature of the bottom: Filtering layer consisting of:
300 mm of pebbles, 30–150 mm
200 mm of pebbles, 8–30 mm
100 mm of electric furnace slag, 0–3 mm
Nature of the walls: electric furnace slag of the same granulometry as above.

Characteristics of the pulp

Slime with grain sizes of less than 13 microns, consisting of the fine part of nickel minerals (iron and magnesium silicates and iron oxides)
Dilution: 5% of solids
Flocculation with a dose of 50 g of flocculating agent per ton.

Characteristics of the spread

Pulp discharge: 35 m³/h
Spreading point: center of the basin
Amount spread: 70 kg/m²

Characteristics of the drying

Slope of dry products: 0.4 meters per 1000 meters
Dryness after 30 days (approximately 65%)

Characteristics of the collection

Front feeder: 60 tons/h

We find that, in this example, there is a very considerable lateral percolation through the small walls, with a tendency towards the formation of fissures in them. Drying is possible, but said tendency toward the formation of fissures limits the amount of water and, in consequence thereof, the quantity spread per m². Drying is slightly less good, since there is a tendency toward clogging of the wall.

EXAMPLE 3

Application of the method to nickeliferous slimes obtained by the washing of garnieritic mineral.

Characteristics of the beds

Dimensions: 20×25 m
Height of the wall: 0.55 m
Gradient: 0 meters per 1000 meters
Nature of the bottom: Filtering layer consisting of:
300 mm of pebbles, 30–150 mm
200 mm of pebbles, 8–30 mm
100 mm of electric furnace slag, 0–3 mm
Nature of the walls: electric furnace slag of the same granulometry as shown.

Characteristics of the pulp

Slime with grainsizes of less than 13 microns, consisting of the fine parts of nickel ore (iron and magnesium silicates and iron oxides)
Dilution: 21.6% of solids
Flocculation with a dose of 200 g of flocculating agent per ton.

Characteristics of the spread

Pulp discharge: 15 m³/h
Spreading point: 2 m for the edge of a small side of the basin
Amount spread: 100 kg/m²
Slope observed at end of spreading: 0.4 meters per 1000 meters.

Characteristics of the drying

Slope of dry products 0.3 meters per 1000 meters
Dryness after 30 days (approximately 65%)

Characteristics of the collection

Front feeder: 60 tons/h

The slope leads to a thickness of the slime that varies widely from one point to another, which is possible in a small basin, but is not practical in an industrial installation. The products collected where the layer is thin, are pulverulant and create dust. The products collected where the layer is thick are a plastic slime that is difficult to handle.

What is claimed is:

1. Method of naturally drying a mining and metallurgical pulp selected from the group consisting of nickel and nickel-ferrous slimes the solids content of which has a $d_{80}$ of less than 100 microns, by separating water therefrom, comprising the following steps:
    (a) adjusting the solids content of pulp to between 2 and 25%;
    (b) adding a flocculating agent to the adjusted pulp and mixing the flocculating agent with the pulp, the flocculating agent comprising between two-thirds and 98% of the optimum amount required for the flocculation of said pulp;
    (c) spreading said mixture of pulp and flocculating agent, in the open air, in a bed the sides of which are permeable, and the bottom of which has a slope of less than 5 meters per 1000 meters, said spreading taking place 1 to 20 minutes after the adding and mixing of said flocculating agent with said pulp; and
    (d) naturally drying said mixture of pulp and flocculating agent by removing separated water from said bed.

2. Method according to claim 1, wherein the solids content of the pulp is adjusted to between 5 and 15%.

3. Method according to claim 1, wherein the amount of the flocculating agent is between 85 and 95% of the normal minimum amount of flocculant for the flocculation of such a pulp.

4. Method according to claim 1, wherein said spreading of the pulp takes place 2 to 10 minutes after the adding and mixing of the flocculating agent with the pulp.

5. Method according to claim 1, wherein said bed is in the shape of a rectangle having a ratio of length to width between 1 and 50.

6. Method according to claim 5, wherein the width of said rectangle is between 5 and 100 m.

7. Method according to claim 1, wherein the bottom of the bed consists of a material selected from the group consisting of filter sand and pulverised soil.

8. Method according to claim 1, wherein the bottom of said bed consists of sand the grains of which have a size ranging from 20 microns to 3 mm.

9. Method according to claim 1, wherein the sides of said bed consist of walls the height of which are between 0.5 and 1 m.

10. Method according to claim 1 wherein the sides of said bed consist of strands of grainy material.

11. Method according to claim 10, wherein said grainy material is sand whose grain size ranges from 200 microns to 3 mm.

12. Method according to claim 1, wherein said sides include small nozzles for the removal of water.

13. Method according to claim 12, wherein said small nozzles are removable.

14. Method according to claim 1, wherein the amount of spread pulp corresponds to a mass of solid matter per m$^2$ ranging from 50 to 200 kg.

15. Method according to claim 1, wherein the rate of spreading lies between 2 and 20 kg/h/m$^2$.

16. Method according to claim 1, wherein the solid content of the pulp has a $d_{80}$ of less than 20 microns.

* * * * *